United States Patent [19]

Fowler

[11] Patent Number: 4,634,460
[45] Date of Patent: Jan. 6, 1987

[54] DRAIN BUSHING

[75] Inventor: Samuel R. Fowler, Tuscon, Ariz.

[73] Assignee: Manville Service Corporation, Denver, Colo.

[21] Appl. No.: 820,277

[22] Filed: Jan. 17, 1986

[51] Int. Cl.$^4$ ............................................. C03B 37/09
[52] U.S. Cl. ........................................ 65/1; 65/173; 65/DIG. 4; 219/10.81
[58] Field of Search .................. 65/1, 2, 173, DIG. 4; 219/10.81

[56] References Cited

U.S. PATENT DOCUMENTS 4,099,948  7/1978  Thomas ........................................ 65/1
4,566,888  1/1986  Schaefer ...................................... 65/1

FOREIGN PATENT DOCUMENTS 380596   7/1973  U.S.S.R. ................................... 65/1
704917  12/1979  U.S.S.R. ................................... 65/1

Primary Examiner—Robert Lindsay
Attorney, Agent, or Firm—John D. Lister; Cornelius P. Quinn; Gregory A. Evearitt

[57] ABSTRACT

A non-precious metal drain bushing for use in the start-up of a glass melting furnace. Relatively thin, wide terminal ears extend outwardly and downwardly from the ends of the bushing and are supported against bending stresses by a rigid band or strip which contacts the outer surface of the ears and extends along the bottom wall of the bushing toward the other end for a substantial distance. In addition to the physical reinforcement it provides, the strip also acts to electrically widen the terminal ears.

12 Claims, 5 Drawing Figures

DRAIN BUSHING

FIELD OF THE INVENTION

This invention relates to a drain bushing for use in the start-up of a glass melting furnace, and more particularly to a drain bushing formed of non-precious metal.

BACKGROUND OF THE PRIOR ART

In the start-up of a new or rebuilt furnace for melting glass in a glass fiberizing process it is necessary to run the furnace for a period of time until the melting process has stabilized and impurities from the construction, such as particles of refractory material, have been flushed from the system. The molten glass in the system during this period is drained through drain bushings, which are electrically heated to very high temperatures and which typically have two or three large drain holes as opposed to the large number of very small apertures in the fiberizing bushings used in the production of glass filaments.

The fiberizing bushings are normally formed of precious metal, such as platinum/rhodium alloys, which are very expensive due to the cost of the precious metal and the cost of fabrication. Drain bushings also have been formed of precious metal, at consequent high cost. Since drain bushings are used only for relatively short periods of time, in the order of five to ten days, it is not necessary that they have a long life. This in fact is detrimental from a cost standpoint because it results in an unnecessarily large amount of precious metal being tied up in drain bushings which are used only infrequently. It would be better to use drain bushings formed from non-precious metal, provided they are able to adequately withstand erosion from the molten glass until the draining operation is over, and provided they can be adequately heated to the required temperatures.

The usual vertically arranged relatively thick lug-type terminal typically used with precious metal bushings has not been found to allow satisfactory electrical heating of a non-precious metal drain bushing. The heat is not dispersed uniformly throughout the bushing, resulting in hot spots which are deleterious to the life of the bushing and which do not promote stable operating conditions. Other types of conventional terminals, such as the wider wing-ear style, have not been found to be satisfactory either. The desired heating patterns are still difficult to achieve and the terminal ears, when made thin enough to obtain better heat transmission, display a tendency to bend when subjected to the pressures caused by the power clamp over a period of time.

SUMMARY OF THE INVENTION

This invention solves the problems mentioned above by providing a non-precious metal drain bushing having a novel terminal arrangement which allows the bushing to be electrically heated. In addition to use of a relatively wide terminal ear, means are provided for reinforcing or supporting the ear against bending and at the same time for effectively electrically widening the ear so as to promote more uniform distribution of the heating current.

The various features of the invention and the benefits thereof will be made more clear in the following detailed description of the invention.

DESCRIPTION OF THE INVENTION

Figure 1:
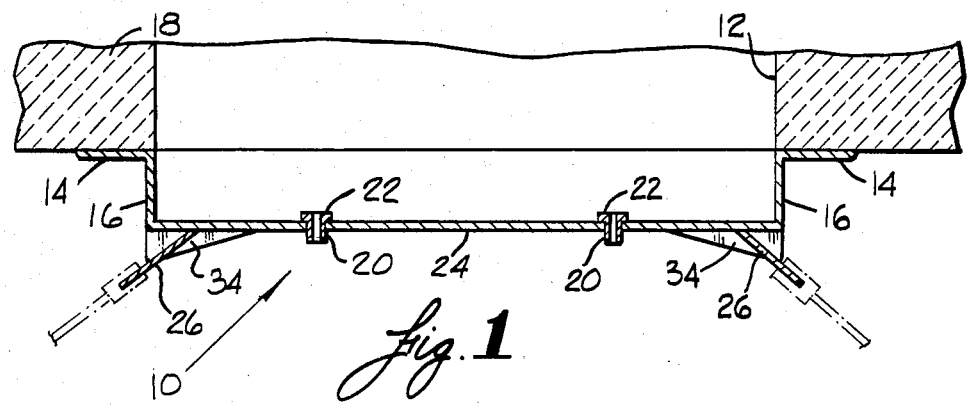
FIG. 1 is a partial vertical sectional view of an installed drain bushing of the present invention.

Referring to FIG. 1 of the drawing, the drain bushing 10 is shown in installed condition beneath the opening or passage 12 leading to glass melter, not illustrated. Flanges 14, shown extending outwardly from end walls 16, abut the underside of the refractory lining 18 surrounding the passage 12. During start-up of the melting furnace molten glass flows through the passage and into the drain bushing 10. It then flows through the drain apertures in the bushing which typically consist of hollow tubes or tips 20 held in place by blocks 22 which are secured, as by welding, to the bottom wall 24 of the bushing.

Extending outwardly and downwardly from the bottom wall 24, near the junctures of the bottom wall 24, near the junctures of the bottom wall and end walls 16, are terminal ears 26. In operation the terminal ears would be connected to clamps, shown in phantom, which deliver the heating current to the bushing.

Figure 2:
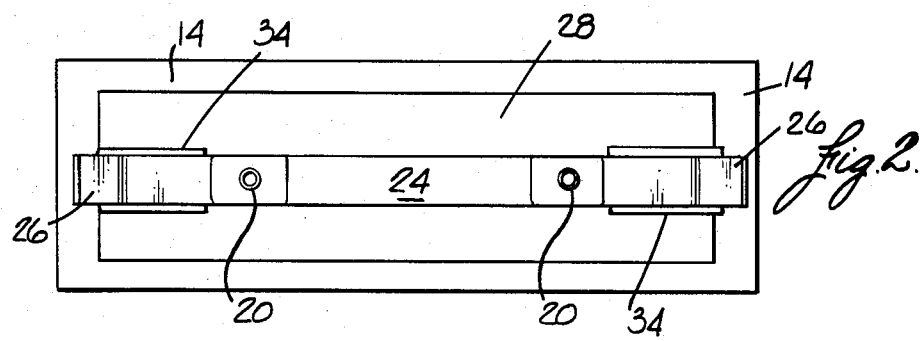
FIG. 2 is a bottom plan view of the bushing.
Figure 3:
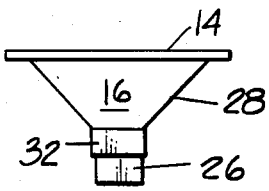
FIG. 3 is an end elevation of the bushing.

As shown in FIGS. 2 and 3, the bushing also has side walls 28 connected to the end walls 16 and the bottom wall 24. As can be seen, the flanges 14 extend from the side walls as well as from the end walls, abutting the refractory lining surrounding the passage 12.

Preferably, the upper opening of the well or receptacle formed by the bushing walls is larger than the bottom wall so that the side walls 28 converge toward the bottom wall 24, thereby reducing any tendency of the molten glass to form dead spots of reduced flow. The terminal ears 26 extend at their bases across the full width of the relatively narrow bottom wall 24, thereby providing a relatively wide area of electrical input and a relatively large area for engagement with the clamp. Despite this arrangement, the current is still too concentrated to result in an even distribution of heat. Further, the wide and relatively thin terminal ear tends to bend over a period of time when subjected to the continuing stresses caused by the clamping arrangement. Efforts to thicken the terminal ears to stiffen them would be counterproductive to the desired pattern of heat distribution because the thicker the terminal the more concentrated the heating pattern tends to be.

Figure 4:
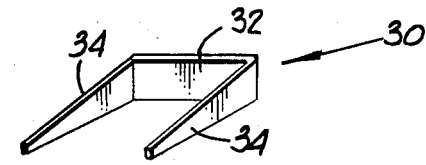
FIG. 4 is a pictorial representation of a reinforcing gusset comprising part of the terminal ear arrangement.
Figure 5:
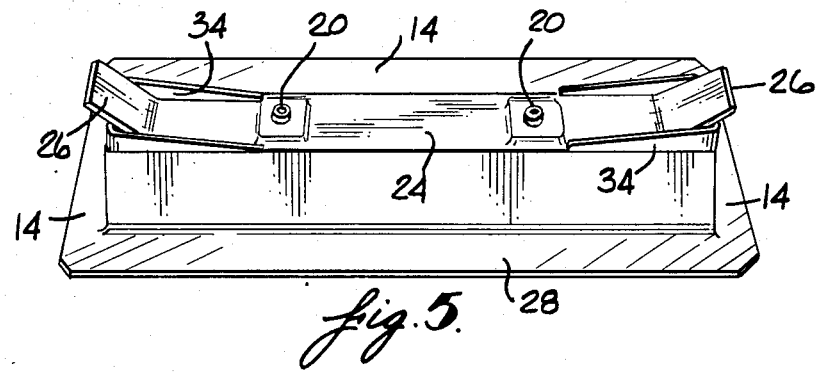
FIG. 5 is a pictorial representation of the bottom of the drain bushing of the present invention, showing the terminal ear arrangement more clearly.

To solve this delemma a gusset 30 is provided, which as shown in FIG. 4 is a generally U-shaped strip or band having a central portion 32 and two legs 34 extending at substantially right angles therefrom. The legs 34 are tapered, allowing them to extend a relatively long distance from the central portion 32 while requiring a minimum of material to accomplish this. As can be seen in FIGS. 1-3 and FIG. 5, when the gusset is in place on the bushing the central portion 32 extends along the end of the bottom wall 24 and the legs 34 extend along the sides of the bottom wall for a substantial distance. The upper part of the central portion 32 is in contact with the terminal ear 26, providing support for the ear. The ears and the gussets are integrally connected to the bottom wall of the bushing as by welding, so that the heating current supplied to the bushing from the clamps through the terminal ears is delivered to the bushing through the gusset as well. This has the effect of electrically widening the terminal ears. In other words, current is delivered to the bushing as if much wider ears, minus the gusset, were used. Of course the use of such wide ears would be impractical due to lack of space and the increased tendency of even wider ears to bend.

It should be understood that even though the terminal ear tends to bend, it is still preferably thicker for structural and power distribution purposes than the walls and flanges of the bushing. Preferably, the bottom wall is also thicker, particularly for structural reasons.

The bushing of the present invention is of similar basic design to that of conventional drain bushings so that the size of the passageway leading to the bushing and the bushing mounting means itself can remain the same as always. With the design of this invention, however, a non-precious metal can be used to fabricate the bushing. Although other non-precious metal materials may be used a preferred material is Inconel 600, a commercially available alloy produced by International Nickel Company and containing chromium, nickel and iron.

The bushing can be readily fabricated by cutting the various elements of the bushing to size and welding them together. Although the relative thicknesses of the elements can vary, in one preferred embodiment the bottom wall and the terminal ears were $\frac{1}{4}$ inch thick while the side walls, end walls and flanges were only 1/16 inch thick. The tips were formed of stainless steel but could also be formed of the same Inconel alloy used for the other elements.

It should now be clear that the present invention provides a simple but effective drain bushing design enabling it to be formed of non-precious metal. Obviously, although a preferred embodiment has been described, certain specific details of the design can be changed without departing from the spirit of the invention.

What is claimed is:

1. A non-precious metal drain bushing for draining molten glass from a glass melting apparatus, comprising:
   electrically conductive side walls, end walls and bottom wall connected to each other to form a receptable for molten glass,
   the bottom wall containing apertures through which molten glass can flow,
   an electrically conductive relatively thin terminal ear extending from the receptacle adjacent each end thereof,
   the width of the terminal ears extending in the direction of the width of the receptacle for a substantial distance, and
   electrically conductive means for reinforcing the terminal ears against bending stresses, said means also being configured so as to electrically widen the conductive action of the terminal ears.

2. A drain bushing according to claim 1, wherein the reinforcing means support the terminal ears along the width of the ears and also extend toward each other in the direction of the length of the receptacle.

3. A drain bushing according to claim 2, wherein the width of the bottom wall of the receptacle is substantially the same as the width of the base of the terminal ears.

4. A drain bushing according to claim 3, wherein the side walls of the receptacle are spaced apart a greater distance at the top of the receptacle than at the bottom.

5. A drain bushing according to claim 1, wherein the terminal ears extend outwardly and downwardly from the receptacle and wherein each reinforcing means is a band engaging the outer face of the ear it is reinforcing adjacent the base of the ear.

6. A drain bushing according to claim 5, wherein each band comprises a central portion connected to the receptacle adjacent the juncture of the end walls and bottom wall and leg portions connected to the receptacle for a substantial distance adjacent the juncture of the side walls and bottom wall.

7. A drain bushing according to claim 6, wherein the band is connected to the receptacle by welding.

8. A drain bushing according to claim 7, wherein the height of the legs of the reinforcing band tapers to a lower height along the length of the legs.

9. A non-precious metal drain bushing for draining molten glass from a glass melting apparatus, comprising:
   electrically conductive side walls, end walls and bottom wall connected to each other to form a receptacle for receiving molten glass,
   the bottom wall containing apertures through which molten glass can flow,
   the width of the terminal ear extending in the direction of the width of the receptacle for a substantial distance, and
   means for electrically widening the conductive action of the ears.

10. A drain bushing according to claim 9, wherein the means for electrically widening the conductive action of the ears comprises a strip of electrically conductive material extending from the side edges of the ears toward the opposite end of the receptacle.

11. A drain bushing according to claim 10, wherein the strip is rigid and acts to reinforce the terminal ears against bending stresses.

12. A drain bushing according to claim 11, wherein the bushing receptacle, the terminal ears and the reinforcing strip are formed from an alloy comprising nickel, chromium and iron.

* * * * *